May 22, 1923. 1,455,825
R. W. WOOD
OPTICAL METHOD OF OBTAINING LINEAR DIMENSIONS
Filed June 15, 1921 3 Sheets-Sheet 1

Inventor
R. W. Wood.
By Joseph K. Schofield
Attorney

May 22, 1923.
R. W. WOOD
OPTICAL METHOD OF OBTAINING LINEAR DIMENSIONS
Filed June 15, 1921   3 Sheets-Sheet 2
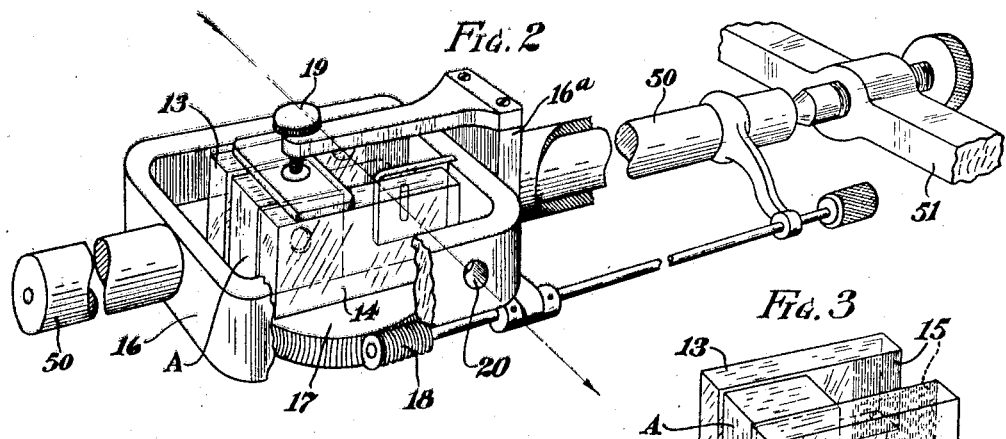
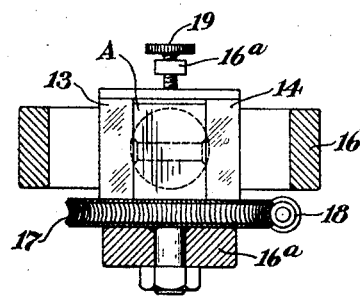
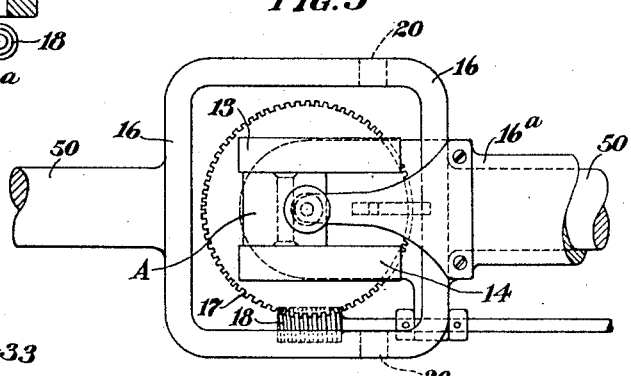
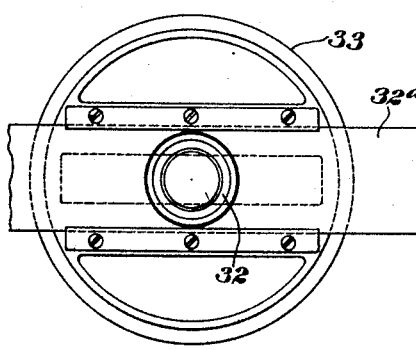
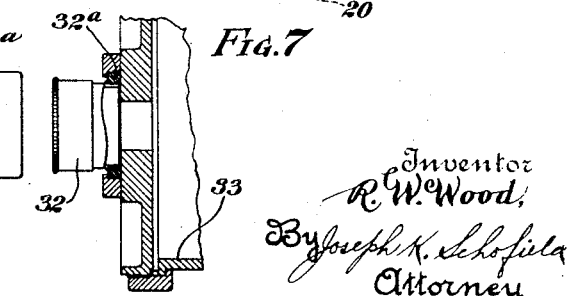

May 22, 1923.  
R. W. WOOD  
OPTICAL METHOD OF OBTAINING LINEAR DIMENSIONS  
Filed June 15, 1921    3 Sheets-Sheet 3
1,455,825
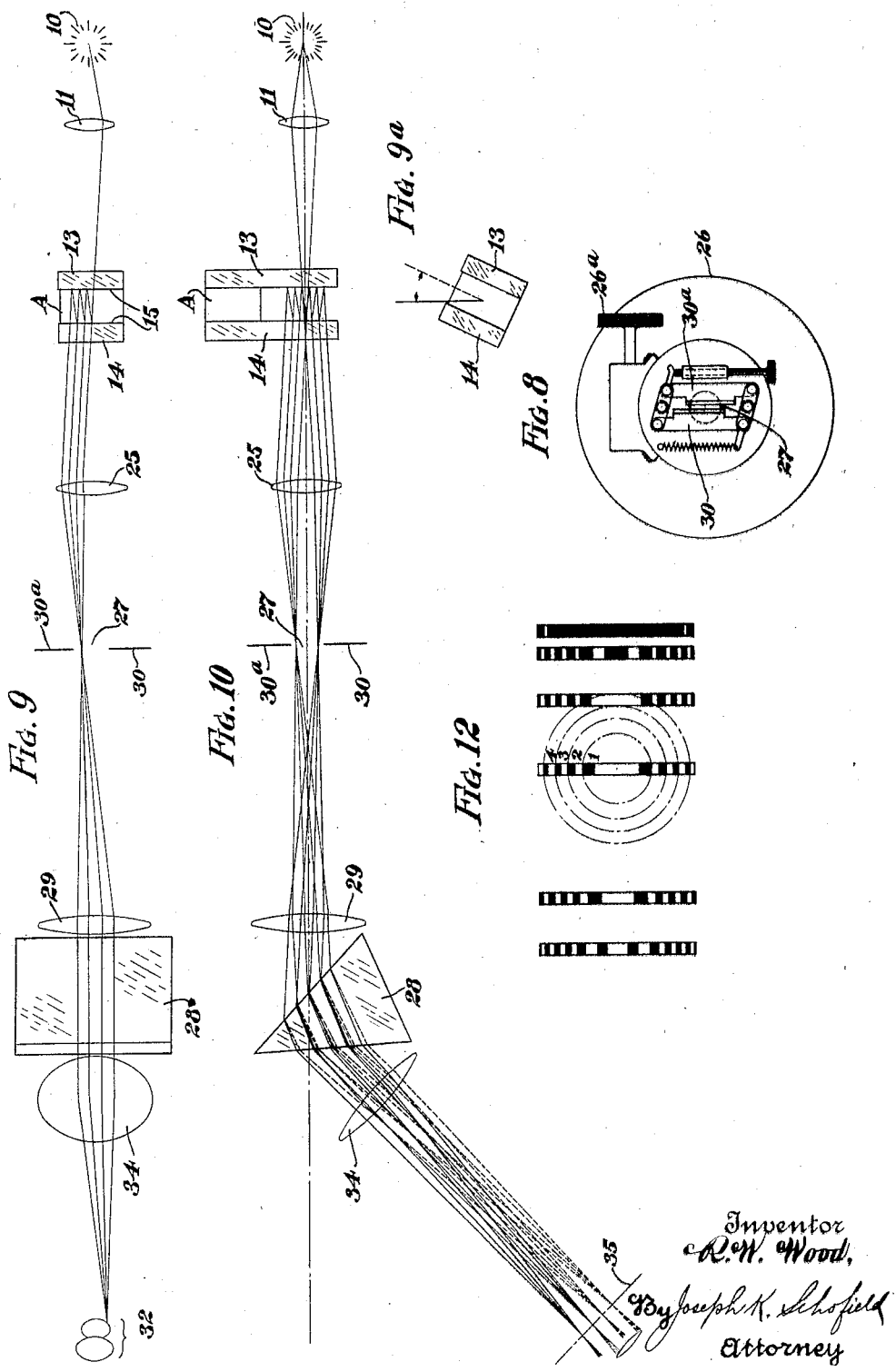

Patented May 22, 1923.

1,455,825

UNITED STATES PATENT OFFICE.

ROBERT W. WOOD, OF BALTIMORE, MARYLAND, ASSIGNOR TO PRATT & WHITNEY COMPANY, OF NEW YORK, N. Y., A CORPORATION OF NEW JERSEY.

OPTICAL METHOD OF OBTAINING LINEAR DIMENSIONS.

Application filed June 15, 1921. Serial No. 477,716.

*To all whom it may concern:*

Be it known that I, ROBERT W. WOOD, a citizen of the United States, residing at Baltimore, in the State of Maryland, have invented certain new and useful Improvements in Optical Methods of Obtaining Linear Dimensions, of which the following is a specification.

This invention relates to a method of obtaining linear dimensions and in particular to an optical method of obtaining distances between flat parallel end faces of a specimen.

The object of the present invention is to provide an improved optical method of obtaining the distance between two plane parallel surfaces by observation of interference fringes formed by a Fabry and Perot interferometer. More particularly it is an object of the present invention to provide a method of obtaining the dimensions of a gage, or other article, having flat and parallel end surfaces in terms of the number of light waves of known lengths between the end faces of the article.

One feature which enables me to obtain the dimensions of a gage, or other article, having flat parallel end faces in terms of wave lengths of light, is the provision of an apparatus enabling me to determine the interference effect of light waves of known wave lengths traversing oblique paths of different optical lengths between planes contiguous with the flat parallel end faces of the article being measured.

Another feature which is advantageous is that, during the taking of the measurements, the article examined is mounted between members having plane surfaces contiguous to its end faces, the members and articles being rotated after adjustment through a very small angle about an axis parallel to the surfaces and in the plane of dispersion of a prism thus enabling me to obtain accurate readings of interference effects of light waves after passing through the interferometer in different oblique paths. The light of different wave lengths is observed after passing through the interferometer and through the dispersing prism at the eye piece of a telescope focussed on the interference bands or fringes, the angle through which the article is tilted being accurately determined between observations of the fringes.

With these and other objects in view, my invention consists in the method and apparatus set forth in the following specification and carried out in the construction illustrated in the accompanying drawings.

In the accompanying drawings annexed hereto and forming a part of this specification, I have shown but one modification of an apparatus for carrying out my improved method, but it will be understood that the invention can be otherwise carried out and that the drawings are not to be construed as defining or limiting the scope of the invention, the claims appended to this specification being relied upon for that purpose.

In the drawings:

Fig. 2 shows a perspective view of the support for the specimen being tested, this mounting forming a Fabry and Perot interferometer in a novel form of support.

Fig. 3 shows a detail view of the interferometer.

Fig. 4 shows an elevation in section of the support and the specimen being examined.

Fig. 5 shows a plan view of the same.

Fig. 6 shows a front view of the eye piece forming a part of the apparatus.

Fig. 7 shows a fragmentary longitudinal section of the same.

Fig. 8 shows a front view of an adjustable shutter used in the apparatus.

Fig. 9 shows in elevation the optical parts of the invention and the path of a light wave therethrough.

Fig. 9ª shows the interferometer tilted to an angular position.

Fig. 10 shows a plan view similar to Fig. 9.

Figure 11:
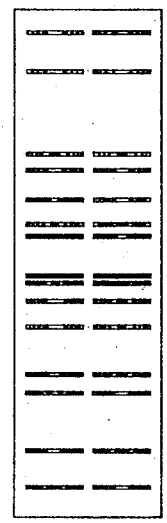

Fig. 11 shows two views of interference fringes or bands formed by the present apparatus, these being taken photographically.

Fig. 12 shows an enlarged view of some of the fringes.

Briefly, in its broadest aspect, my invention may be carried out in an apparatus having the following principal parts: First, a source of light; second, a Fabry and Perot interferometer forming a mounting of novel form for the specimen to be measured; third, a shutter having a narrow aperture through which the rays of light from the source pass after being focussed thereon by a suitable lens; fourth, a dispersing element such as a prism inserted in the path of the rays after they have passed through the aperture and a collimating lens; fifth, a telescope by which the light rays may be focussed after they have been refracted and dispersed by the prism; sixth, means for tilting the interferometer through a small angle about an axis in the plane of dispersion of the prism; and seventh, means whereby the angle may be accurately determined.

Figure 1:
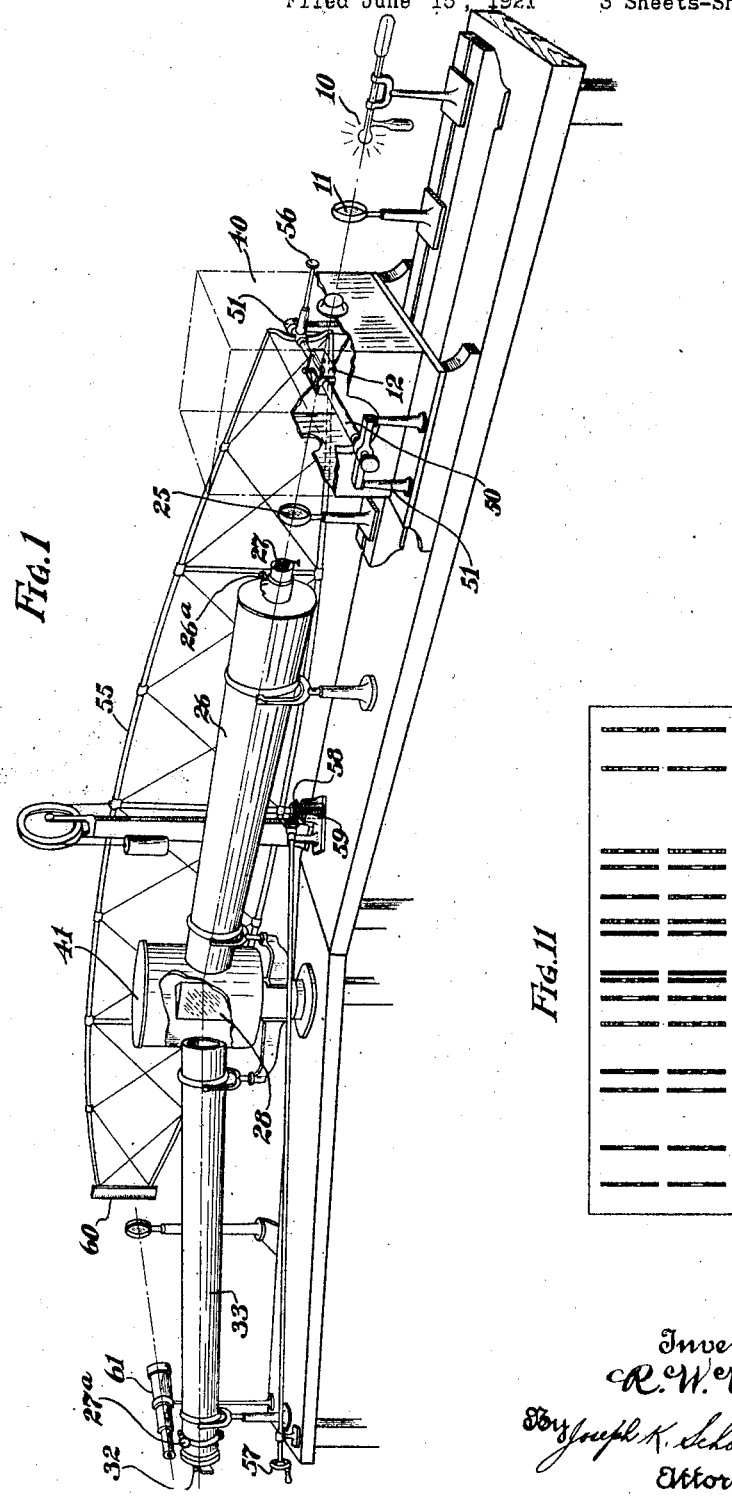
Figure 1 shows a perspective view of the complete apparatus.

Referring first to the different elements of the apparatus, the source of light in the preferred form of the invention is provided by an electric discharge through an atmosphere of neon or argon. This gives a number of narrow spectral lines of sufficient intensity and difference of wave lengths to be suitable for the purposes. This luminous source is shown at 10 in Figure 1.

The interferometer as shown at 12 (see Fig. 3) is of the Fabry and Perot type, that is, it comprises two plane and parallel surfaces capable of both reflecting and transmitting light. This interferometer with its attached parts forms a mounting for the specimen to be measured. As above indicated the specimen which is shown in the form of a block gage A has its opposite end faces flat and parallel. Contiguous to these end faces are plane surfaced glass or quartz plates 13 and 14 preferably secured to the gage A by contact intimate enough to cause them to adhere by wringing together of the surfaces. These glass or quartz plates 13 and 14 have optically plane surfaces contiguous with the end faces of the gage being examined which are extended beyond the sides of the gage. On the extended portions of these glass, or other transparent plates 13 and 14, is deposited a very thin coating of reflecting material as indicated at 15. Preferably I deposit a very thin coating of gold, or other metal as silver or nickel, so thin that the surfaces may transmit about one half of the light waves through the metallic film and may also reflect the remaining portion of the rays. This may be accomplished by electrolytical deposition from a metal cathode in a high vacuum.

The specimen A between the two transparent plates 13 and 14 is mounted in a holder 16 which may be oscillated about its central longitudinal axis. Of this mounting 16 is a small turntable, or other rotatable member, 17 which may be rotated by any convenient means as the worm 18 about an axis normal to the axis of the holder. The purpose of this table is to adjust the planes so that they will be parallel to the tilting axis. Any suitable clamping means 19 may be utilized to clamp the specimen A and plates 13 and 14 on this turntable 17 while permitting rotation of the turntable with the specimen A in position thereon. The holder 16 is provided with apertures 20 on either side permitting a narrow ray of light to pass from side to side of the holder 16 and interferometer 12, some of these rays passing directly through and others being reflected between the extended metallized portions 15 of the glass plates 13 and 14 before emerging from the plate 15.

A slight amount of movement in the direction of the axis of the support 16 is permitted for the interferometer 12 so that different portions of the plates 13 and 14 may be placed in alignment with the orifices 20. This may be accomplished by a bracket 16ª on the member 16 to which the table 17 is rotatably fastened, a part of the bracket 16ª surrounding and being adjustably secured to a part of the holder 16.

The dispersing and refracting means for the light waves comprises a prism 28 mounted in a suitable chamber having a tube 26 extending toward the interferometer 12 and another tube forming the barrel of a telescope 33 extending in the direction taken by the refracted rays. The telescope 33 has an eye piece 32 preferably movable laterally by means of a slide 32ª sufficient to cover a large range of light waves emitted from the luminous source 10. At the focal plane of the telescope 33 is a cross hair 35 the position of which is indicated in Fig. 10.

Adjustments in the length of tube 26 and the telescope 27 may be made by adjusting screws 26ª and 27ª to properly focus the lenses used within tube 26 and telescope 33.

In the path of the light waves from interferometer 12, a shutter having a narrow aperture 27 is provided this preferably being made adjustable so as to vary the width of the aperture by movement of two oppositely disposed movable plates 30 and 30ª.

The light waves emitted from the luminous source 10 pass first to the interferometer 12 and, after repeated reflections are transmitted through the metallized surfaces of the glass plates 13 and 14 to a lens 25 which focusses the rays upon one end of the elongated tube 26. To increase the number of rays extending to the interferometer 12 or to give the light source a sufficient angular diameter, I may provide a condensing lens 11 between the luminous source 10 and the interferometer 12. The lens 25, mounted between the interferometer 12 and the aperture 27, it will be understood, focusses an image of the light source including the interference fringes induced by the interferometer 12 upon the forward end of the tube 26.

Each individual ray passing the plates 13 and 14 divides a number of times by virtue of transmission through and reflection from the plates into several rays which are parallel to the original ray (see Figs. 9 and 10). Each ray represents a double reflection between the plates 13 and 14 and therefore leads or lags adjacent members of the same group of rays by twice the distance between the plates multiplied by an angular correction depending on the angle of incidence of the original ray. Since these rays are all parallel, they produce no interference effect until united. This union is accomplished at the slit 27 of the spectroscope by means of the lens 25 which is mounted so that its principal focus is on the slit. Each individual ray from the source is then split up into a group of parallel rays by the interferometer and the field just before entering the lens 25 is made up of parallel groups of rays of every spectral color at every conceivable angle to each other limited only by the angular diameter of the source. The lens 25 converges each parallel group to a differential area on the slit, these points having the same angular separation from one another as the parallel groups had respectively. Each differential area will be either bright or dark depending upon the phase relation of the various rays of the group which are converging on it, and the resulting bright interference portions will be the envelope of the bright differential areas. These have no particular spectral color and will be circles arranged concentrically about the intersection of an axis line and the plane of the slit, the axis line being determined by the normal to the interferometer plates which passes through the optical center of the lens 25.

As the luminous source 10 emits light of many different wave lengths the interference fringes formed by the interferometer 12 overlap each other to such an extent that they appear on the front of the shutter in which aperture 27 is provided as a uniformly illuminated circle. As only a small portion of the interference fringes are needed for the functions performed by this apparatus, I preferably permit but a narrow vertical section of the light impinging on the forward end of tube 26 to pass to the dispersing element 28. In the forward end of the tube 26 therefore, I provide the shutter with the very narrow elongated aperture 27 referred to above, the width of which may be adjusted as desired. This narrow ribbon of light after passing through the slit 27 impinges upon one of the surfaces of the prism 28. Between the slit 27 and the dispersing prism 28 is mounted a collimating lens 29 so that all of the waves as they impinge against the prism 28 are parallel to each other and are thus refracted under the best optical conditions. When refracted from the prism 28, the light waves appear dispersed in accordance with their different wave lengths at the eye piece 32 of the telescope 33. These waves as they emerge from the prism 28 are focussed by a lense 34 mounted on the opposite side of the prism 28 which forms the objective lens of telescope 33.

The prism utilized may be of glass, quartz, or other transparent material, having an apex angle of approxamately 60° and in the preferred form having an index of refraction of approximately 1.66. The angular position of the telescope barrel 33 is made adustable and is so positioned to include the pencil of rays as refracted by the prism 28.

It is essential in carrying out measurements according to the method utilized by this apparatus that the specimen be maintained at a critical or standard temperature. For that purpose, I enclose the support 16 for the interferometer 12 within a suitable box 40, the walls of which may completely enclose it and so arranged that they permit the passage of cooling or heating means to maintain the specimen A at any desired temperature.

Also, the prism 28 should be prevented from fluctuating in temperature as differences of temperature in the different portions of the prism have the effect of distorting the pencil of light waves passing through it. For this purpose, I enclose the prism 28 within a box 41 which may be held at a constant temperature in the same manner as the box 40.

The path of the light waves through the optical parts of the apparatus is shown clearly in Figs. 9 and 10, the aperture 27 being shown widened sufficiently to admit the entire pencil of rays focussed by lens 11 to the prism 28.

Referring to Figs. 11 and 12 characteristic interference fringes are shown of the spectrum of neon as seen at the focal plane 35 of telescope 33 by means of eye piece 32. These, it will be understood, will show the different colors of the spectrum of neon arranged in the order of their wave lengths from right to left. Each of these colored bands which appear as narrow vertical strips of different colored light is broken by transverse black bands. If the narrow slit 27 were omitted and the entire cone of light waves from the interferometer 12 was dispersed by the prism 28, the narrow vertical strips would be in the form of circular alternate dark and colored bands, as indicated in Fig. 12 in dotted lines, these, however would so completely overlap each other that accurate readings would be prevented. By inserting the slit 27 as shown in the apparatus overlapping of the interference fringes is prevented and the individual fringes of each color are kept distinct. The eye piece, by means of which images of the aperture 27 may be seen at the focal plane 35 of telescope 33, is of sufficient scope to show the upper and lower limits of the interference fringe system dispersed and refracted by the prism 28, three or more of these sections of the fringes being visible for each color, or wave length, emitted by source 10. To obtain the angular diameter of the rings forming the fringe system, I measure the angle through which the interferometer 12 is tilted about the axis of support 16 to displace the fringe system so that any one of the rings is shifted a distance equal to its diameter. This may be accomplished by tilting the interferometer 12 so that the cross hair of the eye piece 32 first engages the upper limit of the ring and then the lower limit. This axis about which the specimen is tilted during measurements of the fringe circles is normal to the axis of the dispersing prism 28 and lies in the plane of dispersion of this prism. By this means very accurate measurements of the angle may be taken through which the interferometer 12 is tilted for a large number of fringes which are very close together.

To determine the angle through which the interferometer 12 is tilted between adjustments, I attach a long lever 55 about the axis of the interferometer support 16 having graduations 60 at its outer end. These may be read by the operator by means of a small telescope 61 standing adjacent the position of the eye piece 32.

In carrying out the present method of obtaining the distance between the flat end faces of the specimen A by optical means the specimen is mounted as shown in Fig. 3 between the plates 13 and 14 and adjusted so that the center of the light passing through the interferometer 12 impinges on the shutter and passes through the aperture 27.

The shaft 50 attached to or forming a part of the support 16 carrying the specimen A is mounted on suitable standards 51 so that it, together with the support 16, may easily be rotated about a horizontal axis. In rear of the apparatus is the lever 55 which may be adjustably attached to the shaft 50 after the interferometer has been adjusted by a clamping screw 56. Movement imparted to the lever 55 by means of a hand wheel 57 operating bevel gears 58 and a screw 59 rotates the support 16 together with the specimen A and plates 13 and 14. The rotating table 17 is also adjusted by means of worm 18 so that the path of light from the source 10 passes through the plates 13 and 14 on to the slit 27 in the forward end of the tube 26.

Lever 55 and table 17 are so adjusted that the upper or lower limits of interference rings formed between the plates 13 and 14 looked at through the eye piece 32 of the telescope 33, touch the horizontal cross hair in the eye piece 32. A reading of the graduations 60 at the outer end of the lever 55 is then taken. The lever 55 is then oscillated so that the opposite portion of the same interference ring touches the horizontal cross hair in the eye piece 32. The graduations 60 are again read, the difference between the two readings of the graduations indicating the angle through which the specimen A and the interferometer 12 has been oscillated or the angular diameter of the ring. In positioning the lever 55 so that the interference rings are positioned on the cross hair, any spectral band may be utilized. I preferably use two or more of the spectral bands in different parts of the spectrum of the luminous source upon which independent readings are taken.

With the angles determined through which the specimen A has been tilted about the axis of the rod 50 to displace the rings a distance equal to their respective diameters for a plurality of rings of different wave lengths, the number of light waves of a wave length corresponding to that part of the spectrum observed between the reflecting and transmitting surfaces may be calculated. Then, knowing the wave length of the light observed, the distance between the flat parallel end faces of the specimen may be computed.

Preferably, I take a number of readings, on different rings and different spectral bands, of the angle moved through by the interferometer 12 in positioning the upper and lower limits of the fringe circles on the cross hair 32. Having done this the distance between the plates 13 and 14 may be found by means of the formula below.

In terms of wave lengths the distance between the plates 13 and 14 may be expressed as, $$e = P\lambda + a,$$

where "$P$" is the number of waves, "$\lambda$" the length of the waves and "$a$" a fraction of a wave. Also the optical path of a light ray passing obliquely between the plates 13 and 14 is, $$\frac{e}{\cos i};$$

where $i$ is the angle of the ray. The path difference between different cones of light passing between the plates is $$2e \cos i.$$

If $x$ is the angular diameter of a ring observed at the eye piece then $$2e \cos \frac{x}{2} = P\lambda$$

in which $\frac{x}{2}$ is the angle of incidence of the rays forming the ring and $x$ is the angular diameter of the ring indicated by the readings of graduations 60 on lever 55.

From the above formula and the well known formula $$\frac{P_1}{P} = \frac{\lambda}{\lambda_1}\left(1 + \frac{x^2}{8} - \frac{x_1^2}{8}\right)$$

of Lord Rayleigh, in which $P_1$ and $x_1$ are respectively the number of waves and the angular diameter of rings of different wave lengths, the quantity $P\lambda$ may be determined. Then knowing $\lambda$ for the light observed, the distance $e$, which is the distance between the flat parallel end faces of the gage A, may be calculated.

The complete mathematical analysis of the above formulæ has not been given for the reason that it forms no part of the present invention. The derivation of the Rayleigh equation given above will be found in the "Scientific Papers" of Lord Rayleigh, volume 5, pages 313 to 329. Other formulæ and equations will be found to be derived and discussed in " Scientific Papers of the U. S. Bureau of Standards, No. 327." In the latter paper an apparatus of which the present application forms an improvement is described.

What I claim is:

1. In an apparatus for determining the dimensions of an article, the combination of a rotatable support for said article, a table mounted thereon, two plates mounted on said table having plane surfaces contiguous with surfaces of the article being examined, said surfaces being adapted to transmit and reflect light waves received upon them, and means to determine an angle through which said support may be rotated.

2. In an apparatus for determining the dimensions of an article, the combination of a rotatable support for said article, a table mounted thereon, two plates mounted on said table having plane surfaces contiguous with surfaces of the article being examined, said surfaces being adapted to transmit and reflect light waves received upon them, a dispersing element cooperating with said support, means to rotate the support upon an axis in a plane of dispersion of the element, and means to determine angles through which said support may be rotated about said axis.

3. In an apparatus for determining the dimensions of an article, the combination of a rotatable support for said article, a table mounted thereon, means to rotate said table about an axis normal to said rotatable support, two plates mounted on said table having plane surfaces contiguous with surfaces of the article being examined, said surfaces being adapted to transmit and reflect light waves received upon them, and means to determine an angle through which said support may be rotated.

4. In an apparatus for determining the dimensions of an article, the combination of a rotatable support for said article, a table mounted thereon, two plates mounted on said table having plane surfaces contiguous with surfaces of the article being examined, said surfaces being adapted to transmit and reflect light waves received upon them, means to determine an angle through which said support may be rotated, and means to move said table in a direction parallel with the axis of said support.

5. In an apparatus for determining the dimensions of an article, the combination of a rotatable support for said article, a table mounted thereon, two plates mounted on said table having plane surfaces contiguous with surfaces of the article being examined, said surfaces being adapted to transmit and reflect light waves received upon them, a dispersing prism cooperating with said support, means to rotate the support upon an axis in a plane of dispersion of the prism, and means to determine angles through which said support may be rotated about said axis.

6. In an apparatus for determining the dimensions of an article, the combination of a rotatable support for said article, a table mounted thereon, two parallel plates mounted on said table having plane surfaces contiguous with surfaces of the article being examined, said surfaces being adapted to transmit and reflect light waves received upon them, and means to determine the angle through which said support may be rotated.

7. In an apparatus for determining the dimensions of an article, the combination of a rotatable support for said article, a table mounted thereon, means to rotate said table about an axis normal to said rotatable support, two parallel plates mounted on said table having plane surfaces contiguous with surfaces of the article being examined, said surfaces being adapted to transmit and reflect light waves received upon them, and means to determine the angle through which said support may be rotated.

8. In an apparatus for determining the dimensions of an article, the combination of a rotatable support for said article, a table mounted thereon, two parallel plates mounted on said table having plane surfaces contiguous with surfaces of the article being examined, said surfaces having thereon a metallic film adapted to transmit and reflect light waves received upon it, and means to determine the angle through which said support may be rotated.

9. In an apparatus for determining the dimensions of an article having flat parallel end faces, the combination of a rotatable support for said article, a table mounted thereon, a pair of plates mounted on said table having plane surfaces in contact with said end faces, said surfaces being adapted to transmit and reflect light waves received upon them, a dispersing prism cooperating with said support, and means to determine an angle through which said support may be rotated about an axis in a plane of dispersion of said prism.

10. In an apparatus for determining the dimensions of an article having flat parallel end faces, the combination of a rotatable support for said article, a table mounted thereon, means to rotate said table about an axis normal to said rotatable support, a pair of plates mounted on said table having plane surfaces in contact with said end faces, said surfaces being adapted to transmit and reflect light waves received upon them, a dispersing prism cooperating with said support, and means to determine an angle through which said support may be rotated about an axis in a plane of dispersion of said prism.

11. In an apparatus for determining the dimensions of an article having flat parallel end faces, the combination of a rotatable support for said article, a table mounted thereon, a pair of parallel plates mounted on said table having plane surfaces in contact with said end faces, each of said surfaces having thereon a metallic film adapted to transmit and reflect light waves received upon it, and means to determine the angle through which said support may be rotated.

12. In an apparatus for determining the dimensions of an article having flat parallel end faces, the combination of a rotatable support for said article, a table mounted thereon, means to rotate said table about an axis normal to said rotatable support, a pair of parallel plates mounted on said table having plane surfaces in contact with said end faces, each of said surfaces having deposited thereon a metallic film adapted to transmit and reflect light waves received upon it, and means to determine the angle through which said support may be rotated.

13. The method of obtaining the distance between two parallel planes comprising, mounting a specimen having flat parallel end faces having in contact therewith members with plane surfaces contiguous to said flat end faces, said surfaces being semi-transparent and reflecting, and adapting a series of light waves to pass through said members and then through a dispersing prism to form portions of spectra, and observing said portions of spectra in different angularly adjusted positions of said plane surfaces.

14. The method of obtaining the distance between two parallel planes comprising, mounting a specimen having flat parallel end faces having in contact therewith members with plane surfaces contiguous to said flat end faces, said surfaces being semi-transparent and reflecting, and adapting a series of light waves of different wave lengths to pass through said surfaces and then through a dispersing prism to form portions of spectra, and observing interference fringes on said portions of spectra of different wave lengths in different angularly adjusted positions of said plane surfaces.

15. The method of obtaining the distance between two parallel planes comprising, mounting a specimen having flat parallel end faces having in contact therewith members with plane surfaces contiguous to said flat end faces, said surfaces being semi-transparent and reflecting, and adapting a series of light waves to pass through said surfaces to form a series of interference fringes and then projecting said interferences through a dispersing prism to form portions of spectra, and observing interference fringes on said portions of spectra effected in different angular positions on said plane surfaces as a specimen and members are rotated about an axis in a plane of dispersion of the prism.

16. The method of obtaining the distance between two parallel planes comprising, mounting a specimen having flat parallel end faces having in contact therewith members with plane surfaces contiguous to said flat end faces, said surfaces being semi-transparent and reflecting, and adapting a series of light waves to pass through said surfaces and then through a narrow aperture to a dispersing prism to form interference fringes on portions of spectra, and observing said interference fringes of said portions of spectra in different angular positions of said plane surfaces.

17. The method of obtaining the distance between two parallel planes comprising, mounting a specimen having flat parallel end faces having in contact therewith members with plane surfaces contiguous to said flat end faces, said surfaces being semi-transparent and reflecting, and adapting a series of light waves to pass through said surfaces to form interference fringes and then through a narrow aperture to a dispersing prism to form portions of spectra, and observing said portions of spectra in different angular positions of said plane surfaces at an eye piece when focussed by a telescope.

18. The method of obtaining the distance between two parallel planes comprising, mounting a specimen having flat parallel end faces between transparent plates having plane surfaces contiguous to said end faces, said surfaces being metallized to reflect and transmit light waves incident obliquely thereto and forming interference fringes thereby, projecting light transmitted and reflected by said surfaces together with the interference fringes toward a dispersing element, dispersing the light incident to said dispersing element, tilting said specimen and plates to different angular adjusted positions, and observing the angle through which the plates are tilted and the effect on the interference fringes corresponding to said tilting.

19. The method of obtaining the distance between two parallel planes comprising, mounting a specimen having flat parallel end faces between transparent plates having plane surfaces contiguous to said end faces, said surfaces being metallized to reflect and transmit light waves incident obliquely thereto and forming interference fringes thereby, projecting light transmitted and reflected by said surfaces together with the interference fringes through a narrow aperture permitting only a portion of said interference fringes to pass, dispersing the light passed through said aperture, tilting said specimen and plates, and observing the angle through which the plates are tilted and the effect on the interference fringes corresponding to said tilting of the plates.

20. The method of obtaining the distance between two parallel planes comprising, mounting a specimen having flat parallel end faces between transparent plates having plane surfaces contiguous to said end faces, said surfaces being metallized to reflect and transmit light waves incident obliquely thereto and forming interference fringes thereby, projecting light transmitted and reflected by said surfaces together with the interference fringes through a narrow aperture permitting only a portion of said interference fringes to pass, projecting said light on a prism dispersing the light passed through said aperture, thereby tilting said specimen and plates to different angular adjusted positions, and observing the angle through which the plates are tilted and the effect on the interference fringes corresponding to said tilting of the plates about an axis in a plane of dispersion of the prism.

In testimony whereof, I hereto affix my signature.

ROBERT W. WOOD.